(12) United States Patent
Boutnaru

(10) Patent No.: US 11,050,709 B2
(45) Date of Patent: *Jun. 29, 2021

(54) DETERMINING SOURCE ADDRESS INFORMATION FOR NETWORK PACKETS

(71) Applicant: PAYPAL, INC., San Jose, CA (US)

(72) Inventor: Shlomi Boutnaru, Modiin (IL)

(73) Assignee: PayPal, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/260,012

(22) Filed: Jan. 28, 2019

(65) Prior Publication Data

US 2019/0327207 A1     Oct. 24, 2019

Related U.S. Application Data

(63) Continuation of application No. 15/608,706, filed on May 30, 2017, now Pat. No. 10,193,855.

(51) Int. Cl.
*H04L 29/12*     (2006.01)
*H04W 40/28*     (2009.01)
*H04W 40/32*     (2009.01)

(52) U.S. Cl.
CPC .......... *H04L 61/25* (2013.01); *H04L 61/2514* (2013.01); *H04W 40/28* (2013.01); *H04L 61/2557* (2013.01); *H04W 40/32* (2013.01)

(58) Field of Classification Search
CPC .... H04L 61/25; H04L 61/2557; H04W 40/28; H04W 40/32; H04W 47/24
See application file for complete search history.

(56) References Cited

U.S. PATENT DOCUMENTS

| 7,784,684 | B2 | 8/2010 | Labrou |
| 7,865,954 | B1 | 1/2011 | Phoha |
| 8,180,892 | B2 | 5/2012 | Derrider |
| 8,588,525 | B1* | 11/2013 | Yagnik ............... G06K 9/00744 382/170 |
| 9,172,629 | B1 | 10/2015 | McRae |
| 9,800,542 | B2 | 10/2017 | Agrawal |
| 2002/0031134 | A1 | 3/2002 | Poletto |
| 2003/0009554 | A1 | 1/2003 | Burch |
| 2003/0023918 | A1* | 1/2003 | Wu ...................... H04L 1/0057 714/751 |
| 2003/0084327 | A1 | 5/2003 | Lingafelt |

(Continued)

*Primary Examiner* — Stephen J Clawson
(74) *Attorney, Agent, or Firm* — Haynes and Boone, LLP

(57) ABSTRACT

A system is configured to perform operations that include determining an exception event corresponding to a transmission of a plurality of network packets over an electronic network. The electronic network may cause network address translation to be performed on the plurality of network packets. The operations may also include identifying, based on a log of the plurality of network packets, a first network packet associated with the exception event and calculating, based on a payload portion of the first network packet, a packet signature corresponding to the first network packet. The operations may further include determining, based on a comparison between a first data structure and a second data structure using the packet signature, original source address information that corresponds to the first network packet prior to the network address translation being performed on the first network packet.

19 Claims, 4 Drawing Sheets

(56) References Cited

U.S. PATENT DOCUMENTS

| | | |
|---|---|---|
| 2003/0200441 A1 | 10/2003 | Jeffries |
| 2004/0093521 A1 | 5/2004 | Hamadeh |
| 2004/0250124 A1 | 12/2004 | Chesla |
| 2005/0037706 A1* | 2/2005 | Settle ................ H04B 7/18586 455/12.1 |
| 2005/0278779 A1 | 12/2005 | Koppol |
| 2007/0041331 A1* | 2/2007 | Ma ....................... H04L 43/024 370/252 |
| 2008/0301237 A1* | 12/2008 | Parsons ................. G06Q 10/10 709/206 |
| 2010/0030651 A1 | 2/2010 | Matotek |
| 2010/0138921 A1 | 6/2010 | Na |
| 2013/0085835 A1 | 4/2013 | Horowitz |
| 2014/0211799 A1 | 7/2014 | Yu |
| 2014/0280825 A1* | 9/2014 | Agrawal ............ H04L 61/2514 709/223 |

\* cited by examiner

DETERMINING SOURCE ADDRESS INFORMATION FOR NETWORK PACKETS

CROSS REFERENCE TO RELATED APPLICATION

This application is a continuation of U.S. application Ser. No. 15/608,706, filed May 30, 2017, which is hereby incorporated by reference in its entirety.

BACKGROUND

A device that monitor communication between computers over an electronic network may detect network exception events in certain instances. The device may further identify network packets that relate to network exception events. However, due to network address translation that have been performed with respect to the identified packets, the device may be unable to identify the particular computer or computers that transmitted the network packets.

Figure 1:
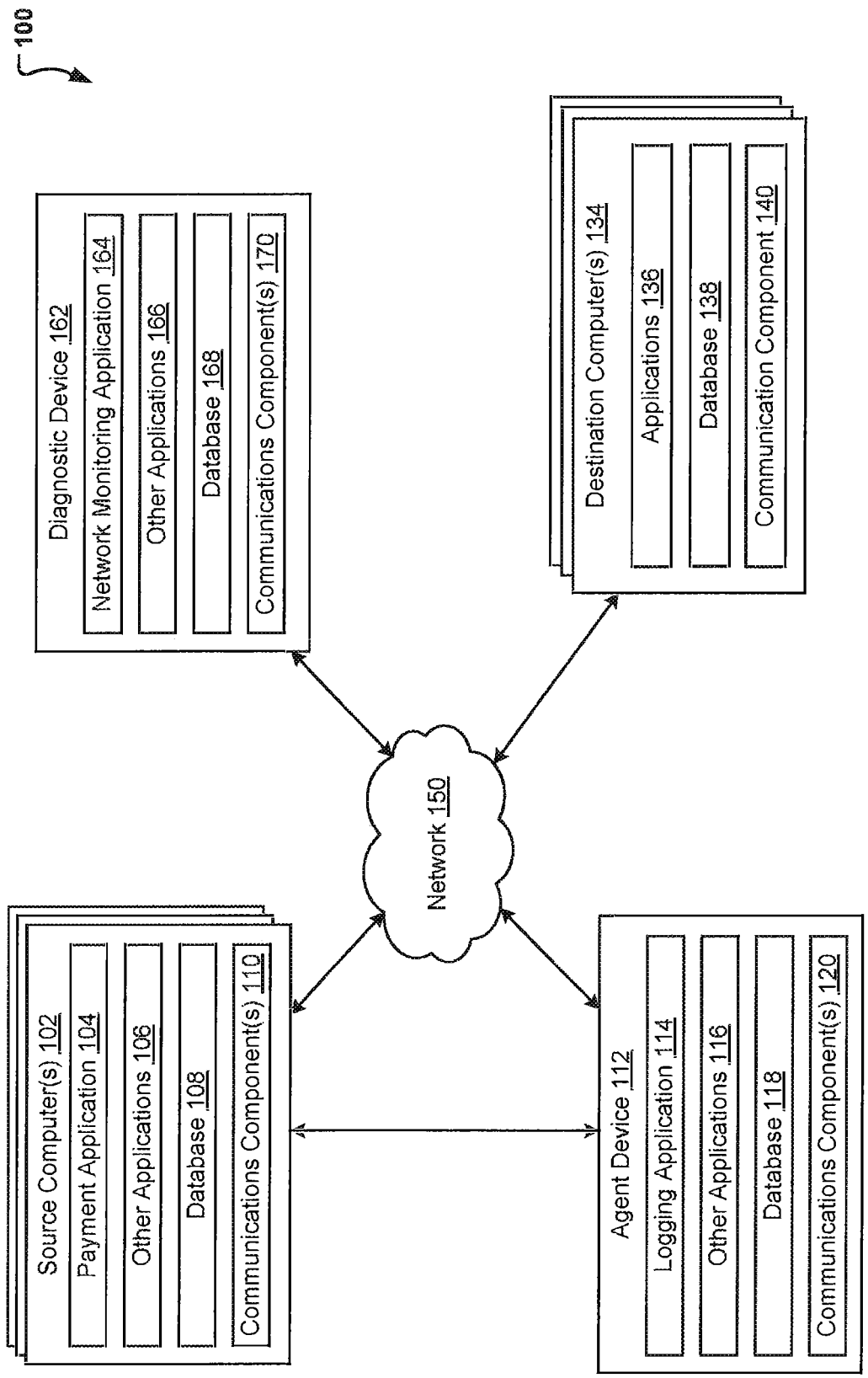
FIG. 1 is a block diagram of a networked system suitable for implementing the processes described herein for determining source address information for network packets.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Systems and methods are provided for determining source address information for network packets. A system may include one or more source computers, one or more destination computers, an agent device, and a diagnostic device in communication with each other over an electronic network. According to particular embodiment, the source computers may be configured to transmit network packets to the destination computers via the network. Furthermore, as a result of passing through the network, the network packets may undergo network address translation by devices included in the network. As a result of the network translation, original source address information associated with the network packets may be mapped to translated source address information. Thus, the original source address information may not be visible to receiving devices (e.g. including the destination computers) that receive the network packets after the network packets have passed through the network. It will be appreciated that original source address information may include network address information (e.g., Internet Protocol (IP) addresses) and/or network port information (e.g., transport layer port attributes such as Transmission Control Protocol (TCP) ports and User Datagram Protocol (UDP) ports).

For instance, a particular network packet that originates from the source computers may have an original source IP address of 192.168.0.1 and a destination IP address of 444.555.777.888. As such, the original source IP address indicates the IP address of the particular source computer that transmitted the particular network packet, and the destination IP address indicates the IP address of the destination computer to which the particular network packet is being transmitted. As a result of network address translation that is performed on the particular network packet while be transmitted through the network, the original source IP address may be changed to a translated source IP address of 109.155.209.167. As such, any device that receives the particular network packet after it has passed through the network would see a source IP address of 109.155.209.167 for the particular network packet and would be unware that the original source IP address was/is 192.168.0.1.

Masking IP addresses in this manner can increase security and IP address space. However, if a network exception event is detected based on network packets that have already passed through the network, it can be difficult to determine which of the source computers contributed to the exception event. The difficultly exists because network address translation has already been performed on the network packets, and the original source address information associated the network packets is therefore unknown.

Thus, the system also includes the agent device and the diagnostic device previously mentioned. The agent device may be in communication with the source computers, such that network packets transmitted by the source computers are received by the agent device before being transmitted through the network. According to certain embodiments, the agent device may store original packet information associated with network packets transmitted by the source computers before the network packets have passed through the network. Original packet information may include, but is not limited to, original source address information, destination address information, timestamp information, and packet signatures. In certain cases, one or more of the original packet information may be determined based on metadata associated with the network packets and/or header information included in the network packets. The original packet information may be stored in a database accessible by the agent device.

The packet signatures may be calculated by the agent device by using various algorithms. For example, the agent device may calculate a packet signature corresponding to a particular network packet based on the payload portion of the particular network packet. In some implementations, the packet signature may be a hash value calculated based on the payload portion and/or a histogram derived from the payload portion. In another implementation, the packet signature may correspond to a data marker that is placed within, appended to, and/or otherwise associated with the payload portion. In other implementations, the packet signatures may be calculated based on packet metadata, such as packet size, timestamp, frequency between packets transmitted using the same connection, and/or the like.

Thus, the agent device may record original packet information corresponding to some or all of the network packets transmitted by the source computers. According to a particular embodiment, the agent device may store an entry in a first database corresponding to the original packet information for each of the transmitted network packets before the transmitted network packets pass through the network. The first database may be a relational database or a non-relational database.

Furthermore, the diagnostic device may receive one or more of the network packets after they have passed through the network. As such, the diagnostic device may store translated packet information corresponding to the received network packets subsequent to the received packets undergoing network address translation. The translated packet information may include, but is not limited to, translated source address information (e.g., translated IP addresses and/or translated TCP or UDP ports), destination address information (e.g., destination IP addresses and/or destination TCP or UDP ports), timestamp information, transport layer protocols (e.g., Transmission Control Protocol (TCP), User Datagram Protocol (UDP), and the like), and packet signatures. In certain cases, one or more of the translated packet information may be determined based on metadata associated with the network packets and/or header information included in the network packets. The diagnostic device may store the translated packet information in a second database.

According to particular embodiments, the diagnostic device may also calculate packet signatures corresponding to each of the received network packets based on the respective payload portions of the received network packets. The packet signatures may be calculated using the same algorithm used by the agent device to calculate the packet signatures for the transmitted network packets before passing through the network (e.g., before network address translation). Additionally, the diagnostic device may store an entry in a second database corresponding to the translated packet information for each of the received network packets subsequent to the received network packets passing through the network. In certain embodiments, the second database may be a relational database or a non-relational database that is different from the first database. In other embodiments, the second database may be the same as the first database in which the agent device records original source address information for the network packets. It will be appreciated that although the original packet information and translated packet information are described as being stored in database or relational databases, other types of data structures may also be used, such as tables, arrays, lists, records, and/or the like.

Based on the original packet information stored in the first database and the translated packet information stored in the second database, original source address information associated with particular network packets can be determined. For example, the diagnostic device may determine that a network exception event has occurred with respect network packets being transmitted by the source computers. The diagnostic device may further identify a particular network packet that corresponds to the network exception event.

In addition, the diagnostic device may calculate, based on a payload portion of the identified network packet, a packet signature corresponding to the identified network packet. By using the packet signature and comparing the first database and the second database, the diagnostic device may be able to determine original source address information associated with the identified network packet. According to a particular embodiment, the diagnostic device may perform a database join operation between one or more portions of the first database and one or more portions of the second database. The database join operation may generate a new data structure (e.g., a new table) that combines common values between the first database and the second database.

The diagnostic device may the use the packet signature as an index into the new data structure to determine a particular record that corresponds to the identified network packet. The particular record may include packet information for the network packet from both before the network address translation and after the network address translation. For example, the packet information may include the translated source address information, destination address information, the packet signature, the transport layer protocol, and the original source address information. As such, based on the packet information included in the particular record, the diagnostic tool may determine the original source address information (e.g., IP address and TCP or UDP port information) corresponding to the identified network packet. Furthermore, based on the original source address information, the diagnostic device may determine a particular source computer (from the source computers) that transmitted the identified network packet and a particular application that caused the transmissions of the identified network packet. Diagnostics or other examination procedure can then be executed with respect to the particular source computer in response to the network exception event.

It will be appreciated that in certain implementations, the agent device and/or the diagnostic device may not calculate packet signatures or store packet information for every single packet transmitted during a network session. Instead, the agent device and/or the diagnostic device may select certain packets in which to calculate corresponding packet signatures and/or store corresponding packet information. The selected packets may be selected based on various factors including, but not limited to, the number of current network sessions (e.g., network connections) that are active in the network, and/or the number of computing resources of the agent device, the diagnostic device, and/or other device that are communicating as part of the network session.

FIG. 1 is a block diagram of a networked system 100 for implementing the processes described herein, according to an embodiment. As shown, system 100 may include or implement a plurality of devices, computers, servers, and/or software components that operate to perform various methodologies in accordance with the described embodiments. Example devices, computers, and servers may include mobile devices, wearable devices, stand-alone devices, desktop computers, laptop computers, and enterprise-class servers, executing an operating system (OS) such as a MICROSOFT® OS, a UNIX® OS, a LINUX® OS, or another suitable device and/or server based OS. It will be appreciated that the devices, computers, and/or servers illustrated in FIG. 1 may be deployed differently and that the operations performed and/or the services provided by such devices, computers, and/or servers may be combined or separated for a given embodiment and may be performed by a greater number or fewer number of devices, computers, and/or servers. Furthermore, one or more of the devices, computers, and/or servers may be operated and/or maintained by the same or different entities.

System 100 includes source computer(s) 102, agent device 112, destination computer(s) 134, and a diagnostic device 162. The source computer(s) 102, agent device 112, destination computer(s) 134, and diagnostic device 162 may communicate over a network 150. The source computer(s) 102, the agent device 112, destination computer(s) 134, and the diagnostic device 162 may each include one or more processors, memories, and other appropriate components for executing computer-executable instructions such as program code and/or data. The computer-executable instructions may be stored on one or more computer readable mediums or computer readable devices to implement the various applications, data, and steps described herein. For example, such instructions may be stored in one or more computer readable media such as memories or data storage devices internal and/or external to various components of system 100, and/or accessible over network 150.

The source computer(s) 102 may be implemented as a communication device that may utilize appropriate hardware and software configured for wired and/or wireless communication with the agent device 112, diagnostic device 162, and/or destination computer(s) 134.

The source computer(s) 102 may execute the applications 106 to perform various other tasks and/or operations corresponding to the source computer(s) 102. For example, the applications 106 may include security applications for implementing client-side security features, programmatic client applications for interfacing with appropriate application programming interfaces (APIs) over network 150, or other types of applications. The applications 106 may also include additional communication applications, such as email, texting, voice, and instant messaging (IM) applications that enable a user to send and receive emails, calls, texts, and other notifications through the network 150. In various embodiments, the applications 106 may include location detection applications, such as a mapping, compass, and/or global positioning system (GPS) applications, which may be used to determine a location of the source computer(s) 102. The other applications may 106 include social networking applications. Additionally, the applications 106 may include device interfaces and other display modules that may receive input and/or output information. For example, the applications 106 may include a graphical (GUI) configured to provide an interface to the user.

The source computer(s) 102 may further include a database 108, which may be stored in a memory and/or other storage device of the source computer(s) 102. The database 108 may include, for example, identifiers (IDs) such as operating system registry entries, cookies associated with the applications 106, IDs associated with hardware of the communication component 110, IDs used for device authentication or identification, and/or other appropriate IDs. In certain embodiments, the source computer(s) 102 may also include information corresponding to payment tokens that are generated for payment transactions. Further, the database 108 may store login credentials, contact information, biometric information, and/or authentication information.

The source computer(s) 102 may also include at least one communication component 110 configured to communicate with various other devices such as the payment processor 114 and/or the destination computer(s) 134. In various embodiments, communication component 110 may include a Digital Subscriber Line (DSL) modem, a Public Switched Telephone Network (PTSN) modem, an Ethernet device, a broadband device, a satellite device and/or various other types of wired and/or wireless network communication devices including microwave, radio frequency, infrared, Bluetooth, Bluetooth low-energy, near field communication (NFC) devices, and/or the like.

The destination computer(s) 134 may be configured to receive the network packets transmitted by the source computer(s) 102. Further, the destination computer(s) 134 may execute the applications 136 to perform various other tasks and/or operations corresponding to the payment provider server and/or the source computer(s) 102. For example, the applications 136 may include security applications for implementing server-side security features, programmatic client applications for interfacing with appropriate application programming interfaces (APIs) over network 150, or other types of applications. The applications 136 may also include additional communication applications, such as email, texting, voice, and instant messaging (IM) applications that enable a user to send and receive emails, calls, texts, and other notifications through the network 150. In various embodiments, the applications 136 may include location detection applications, such as a mapping, compass, and/or global positioning system (GPS) applications. The applications 136 may include social networking applications. Additionally, the applications 136 may include device interfaces and other display modules that may receive input and/or output information. For example, the applications 136 may include a GUI configured to provide an interface to the user.

The destination computer(s) 134 may further include a database 138, which may be stored in a memory and/or other storage device of the destination computer(s) 134. The database 138 may include, for example, IDs such as operating system registry entries, cookies associated with the applications 136, biometric information, IDs associated with communication component 140, IDs used for payment/user/device authentication or identification, and/or other appropriate IDs.

In various embodiments, the destination computer(s) 134 also includes at least one communication component 140 that is configured to communicate with the source computer(s) 102, the agent device, and/or the diagnostic device 162 via the network 150. For example, according to a particular embodiment, the destination computer(s) 134 may receive the network packets from the source computer(s) 102 via the network interface component 140. The network interface component 140 may comprise a DSL modem, a PSTN modem, an Ethernet device, a broadband device, a satellite device and/or various other types of wired and/or wireless network communication devices including microwave, RF, and IR communication devices.

The network 150 may be implemented as a single network or a combination of multiple networks. For example, in various embodiments, the network 150 may include the Internet or one or more intranets, landline networks, wireless networks, and/or other appropriate types of networks. Thus, the network 150 may correspond to small scale communication networks, such as a private or local area network, or a larger scale network, such as a wide area network or the Internet, accessible by the various components of system 100. According to a particular embodiment, the network 150 may include one or more networking devices configured to perform network address translation with respect to network packets that are transmitted through the network 150. For example, a particular network packet that includes original source address information may be transmitted over the network 150. The one or more networking devices may perform network address translation on the particular network packet, which may cause the original source address information to be changed to different address information (e.g., translated source address information).

The agent device 112 may be implemented as a communication device that may utilize appropriate hardware and software configured for wired and/or wireless communication with the source computer(s) 102, diagnostic device 162, and/or destination computer(s) 134.

The agent device 112 may include a logging application 114 that is configured to receive network packets, which have been transmitted by the source computer(s) 102 and that are to be transmitted over the network 150, before the network packets reach and/or pass through the network 150.

Thus, the logging application 114 may receive the network packets before the network packets undergo network address translation from the network 150 (e.g., the one or more network devices included in the network 150).

According to particular embodiment, the logging application may record (e.g., store) original packet information associated with the network packets before the network packets undergo network address translation by the network 150. The original packet information may be stored in a first data structure such as a table, list, a database or relational database (e.g., database 118), and/or the like. The original packet information may include various information related to the network packets that include, but are not limited to, original source address information, original destination address information, original timestamp information, and an original packet signature.

The original source address information for a particular network packet may correspond to the particular source computer of the source computers 102 that transmitted the network packet. In certain implementations, the original source address information may include an IP address of the particular source computer and may also include a TCP or UDP port that corresponds to a particular application executed by the particular source computer. The original destination address information for the particular network packet may correspond to a particular destination computer of the destination computer(s) 134. In certain implementations, the original destination address information may correspond to an IP address of the particular destination computer. The original timestamp information may indicate a first time at which the particular network packet was transmitted by the particular source computer and/or a second time at which the particular network packet was received by the logging application 114.

According to one or more embodiments, the original packet signature for the particular network packet may be calculated by the logging application 114 based on a payload portion of the particular network packet. The payload portion may refer to the actual data that is being transmitted by the particular network packet (e.g., as opposed to other information, such as header information and/or metadata). For instance, the logging application 114 may calculate the original packet signature by generating a hash value based on the payload portion of the particular network packet. It will be appreciated that other algorithms for calculating the original packet signature are also contemplated.

In certain embodiments, the logging application 114 may store original packet information corresponding to each network packet transmitted by the source computer(s) 102 before each network packet passes through the network 150.

The agent device 112 may execute the applications 116 to perform various other tasks and/or operations corresponding to the agent device 112. For example, the applications 106 may include security applications for implementing client-side security features, programmatic client applications for interfacing with appropriate application programming interfaces (APIs) over network 150, or other types of applications. The applications 116 may also include additional communication applications, such as email, texting, voice, and instant messaging (IM) applications that enable a user to send and receive emails, calls, texts, and other notifications through the network 150. In various embodiments, the applications 116 may include location detection applications, such as a mapping, compass, and/or global positioning system (GPS) applications, which may be used to determine a location of the agent device 112. The other applications may 116 include social networking applications. Additionally, the applications 116 may include device interfaces and other display modules that may receive input and/or output information. For example, the applications 114 may include a graphical (GUI) configured to provide an interface to the user.

The agent device 112 may further include a database 118, which may be stored in a memory and/or other storage device of the source computer(s) 102. The database 118 may include, for example, identifiers (IDs) such as operating system registry entries, cookies associated with the logging application 114 and/or other applications 116, IDs associated with hardware of the communication component 120, and/or other appropriate IDs. As previously discussed, the database 118 may also store original packet information corresponding to network packets transmitted by the source computer(s) 102 before the network address translation is performed on the network packets by the network 150. Furthermore, according to certain embodiments, the database 118 may be located remotely from the agent device 112, such as being accessible to the agent device 112 via the network 150 and/or another network.

The agent device 112 may also include at least one communication component 120 configured to communicate with various other devices such as the source computer(s) 102, the diagnostic device 162, and/or the destination computer(s) 134. In various embodiments, communication component 120 may include a Digital Subscriber Line (DSL) modem, a Public Switched Telephone Network (PTSN) modem, an Ethernet device, a broadband device, a satellite device and/or various other types of wired and/or wireless network communication devices including microwave, radio frequency, infrared, Bluetooth, Bluetooth low-energy, near field communication (NFC) devices, and/or the like.

The diagnostic device 162 may be implemented as a communication device that may utilize appropriate hardware and software configured for wired and/or wireless communication with the source computer(s) 102, agent device 112, and/or destination computer(s) 134. In certain embodiments, the diagnostic device 162 may be maintained, for example, by a service provider, such as PAYPAL, Inc. of San Jose, Calif., USA. However, in other embodiments, the diagnostic device 162 may be maintained by or include a financial service provider, social networking service, email or messaging service, media sharing service, and/or other service provider, which may provide payment processing services.

The diagnostic device 162 may include a network monitoring application 164 that is configured to monitor network traffic (e.g., between the source computer(s) 102 and the destination computer(s) 134 over the network 150) network exception events. In response to determining a network exception event has occurred, the network monitoring application 164 may identify a particular source computer of the source computer(s) 102 that transmitted one or more network packets related to the network exception event.

For example, according to particular embodiment, the network monitoring application may receive network packets transmitted by the source computer(s) 102 after the network packets have passed through the network 150. Further the network packets are to be transmitted to the destination computer(s) 134. Thus, the network packet have undergone network address translation by one or more network device included in the network 150. The network monitoring application 164 may further be configured to store translated packet information corresponding to each of the received network packets. The translated packet information may be stored in a second data structure, such as a table, list, database or relational database (e.g., database 168), and/or the like. The translated packet information may include various information corresponding to the received network packets including, but not limited to, translated source address information, subsequent destination address information, subsequent timestamp information, and subsequent packet signature information.

For example, referencing the particular network packet described above with respect to the logging application 114 of the agent device 112, the particular network packet may be received by the network monitoring application 164 after the network packet has passed through the network 150. As such, the translated source address information for the particular network packet may be different from the original source address information of the particular network packet. For example, the particular network packet may initially have original source address information that indicates an IP address of 10.0.0.5 before passing through the network 150. After passing through the network 150 (e.g., after undergoing network address translation by the network 150), the particular network packet may have translated source address information that indicates an IP address of 192.168.2.105. Thus, the original source address information of the particular network packet may be changed to the translated source address information as a result of the network 150 performing network address translation on the particular network packet.

According to a particular embodiment, the subsequent destination address information for the particular network packet may be unchanged from the original destination address information that was stored by the logging application 114 of the agent device 112 for the particular network packet before undergoing network address translation. However, in other embodiments, the subsequent destination address information may be different than the original destination address information due to the network address translation by the network 150.

The subsequent timestamp information may indicate a second time at which the particular network packet is received by the network monitoring application 164. In other embodiments, the subsequent timestamp information may be the same as the original timestamp information stored by the logging application 114 of the agent device 112.

The subsequent packet signature may be calculated by the network monitoring application 164 for the particular network packet based on the payload portion of the particular network packet. The algorithm used by the network monitoring application 164 to calculate the subsequent packet signature may be the same as the algorithm used by the logging application 114 to calculate the original packet signature. Thus, the original payload signature may be the same as the subsequent payload signature.

The translated source address information, subsequent destination address information, subsequent timestamp information, and subsequent packet signature information is stored as a record in the second data structure. It will be appreciated that the network monitoring application 164 may store translated packet information corresponding to the other network packets in a similar manner as described with reference to the particular network packet.

According to a particular embodiment, the network monitoring application 164 may determine that a network exception event has occurred and identify the particular network packet as corresponding to the network exception event. In certain implementations, the particular network packet may be a Transmission Control Protocol (TCP) SYN packet that is transmitted by a first source computer of the source computer(s) 102 to establish a TCP network session with a first destination computer of the destination computer(s) 134. However, the network monitoring application is initially unaware of which of the source computer(s) 102 transmitted the particular network packet because the translated source address information of the particular network packet is not associated with the first source computer and/or is not associated with any of the source computer(s) 102. It will be appreciated that while references may be made to the network monitoring application 164 determining the network exception even based on the particular network packet, in other implementations, the network monitoring application 164 may determine that the network exception event has occurred based on examination of multiple network packets. Further, the multiple network packets may be transmitted as part of a TCP three-way handshake process (e.g., the multiple network packets may correspond to TCP SYN, SYN-ACK, and/or ACK network packets).

The network monitoring application 164 is configured to calculate a packet signature for the particular network packet based on the payload portion of the particular network packet. The network monitoring application 164 may also compare the first data structure and the second data structure and based on the comparison, generate a new data structure that combines common values of the records stored in the first data structure and the second data structure. The network monitoring application 164 may then use the calculated packet signature as an index into the new data structure to determine the original source address information corresponding to the particular network packet.

For instance, the first data structure may correspond to a first database, and the second data structure may correspond to a second database. As such, the network monitoring application 164 may perform a join operation between one or more portions of the first database and one or more portions of the second database to generate a new table. The new table may include a record that indicates, for the particular network packet, the translated source address information, the original source address information, the payload signature, the original timestamp information, and the subsequent timestamp information corresponding to the particular network packet.

The network monitoring application 164 may determine that the calculated payload signature matches the payload signature stored in the new table. Based on the payload signature's association with the original source address information, the network monitoring application 164 may determine the original source address information associated with the particular network packet. As a result, the network monitoring application may also identify the first source computer based on the original source address information.

According to other embodiments, instead of two separate data structures or separate databases, the network monitoring application 164 and the logging application 114 may instead access and/or modify the same data structure or database. For example, the data structure may be accessible via the network 150 by both the network monitoring application 164 and the logging application 114. The data structure may be indexed by payload signatures corresponding to various network packets and may indicate translated source address information, original source address information, original timestamp information, and subsequent timestamp information corresponding to each of the various network packets.

The diagnostic device 162 may execute the other applications 166 to perform various other tasks and/or operations corresponding to the source computer(s) 102. For example, the applications 166 may include security applications for implementing client-side security features, programmatic client applications for interfacing with appropriate application programming interfaces (APIs) over network 150, or other types of applications. The applications 166 may also include additional communication applications, such as email, texting, voice, and instant messaging (IM) applications that enable a user to send and receive emails, calls, texts, and other notifications through the network 150. In various embodiments, the applications 106 may include location detection applications, such as a mapping, compass, and/or global positioning system (GPS) applications, which may be used to determine a location of diagnostic device 162. The other applications may 166 include social networking applications. Additionally, the applications 166 may include device interfaces and other display modules that may receive input and/or output information. For example, the applications 166 may include a graphical (GUI) configured to provide an interface to the user.

The diagnostic device 162 may further include a database 168, which may be stored in a memory and/or other storage device of the diagnostic device 162. The database 168 may include, for example, identifiers (IDs) such as operating system registry entries, cookies associated with the applications 106, IDs associated with hardware of the communication component 170, IDs used for device authentication or identification, and/or other appropriate IDs. Further, the database 168 may store login credentials, contact information, biometric information, and/or authentication information. In certain embodiments, the database 168 may also store the second data structure described above with reference to the network monitoring application 164.

The source computer(s) 102 may also include at least one communication component 170 configured to communicate with various other devices such as the source computer(s) 102, the agent device 112, and/or the destination computer(s) 134. In various embodiments, communication component 110 may include a Digital Subscriber Line (DSL) modem, a Public Switched Telephone Network (PTSN) modem, an Ethernet device, a broadband device, a satellite device and/or various other types of wired and/or wireless network communication devices including microwave, radio frequency, infrared, Bluetooth, Bluetooth low-energy, near field communication (NFC) devices, and/or the like.

Figure 2:
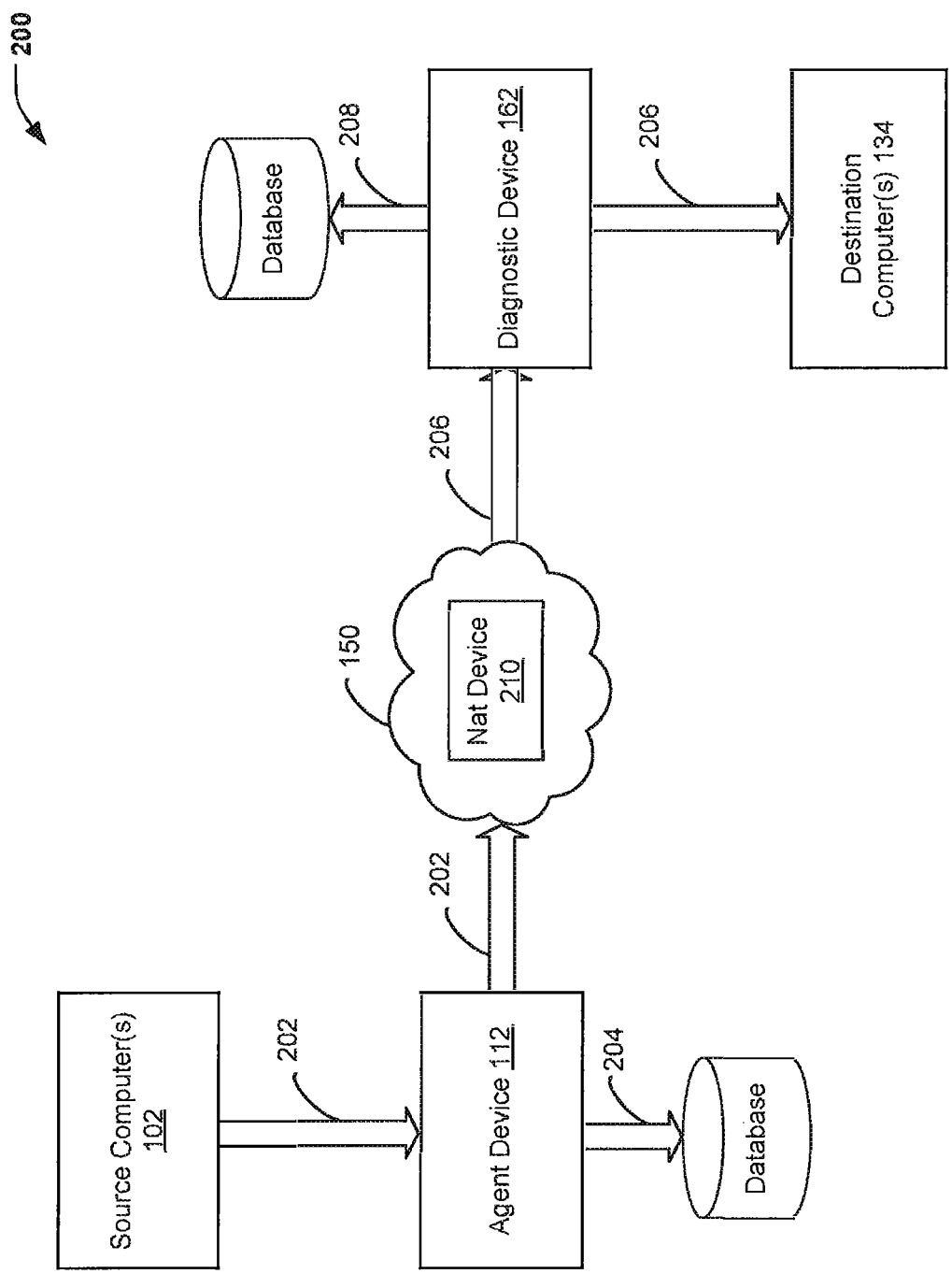
FIG. 2 is an is an example data flow diagram for determining source address information for network packets, according to an embodiment.

Referring now to FIG. 2, a data flow 200 that indicates the flow of network packets according to one or more particular embodiments. As depicted in the data flow 200, the source computer(s) 102 may transmit network packets 202 that are bound for the destination computer(s) 134. The agent device 112 may be configured to receive the network packets 202 before the network packets 202 reach the network 150. As such, the agent device 112 may store original packet information 204 corresponding to the network packets 202 in a first database 210. In certain embodiments, the first database 210 may correspond to the database 118 included in the agent device 112. In other embodiments, the first database 210 may be located remotely from the agent device 112.

According to a particular embodiment, the network 150 may include one or more network address translation device(s) 210. The network address translation device(s) 210 may be configured to perform network address translation with respect to the network packets 202. As a result, after the network packets 202 passed through the network 150, the original packet information 204 may be changed to translated packet information 208 that has been changed or adjusted as a result of the network address translation.

Furthermore, the diagnostic device 162 may be configured to receive the network packets 202 after the network packets 202 pass through the network 150 but before the network packets 202 reach the destination computer(s) 134. As such, the diagnostic device(s) 162 may be configured to store the translated packet information 208 in a second database 212. In some implementations, the second database 212 may correspond to the database 168 included in the diagnostic device 162. In other implementations, the second database 212 may be located remotely from the diagnostic device 162. The network packets 202 are forwarded by the diagnostic device 162 to the destination computer(s) 134.

Figure 3:
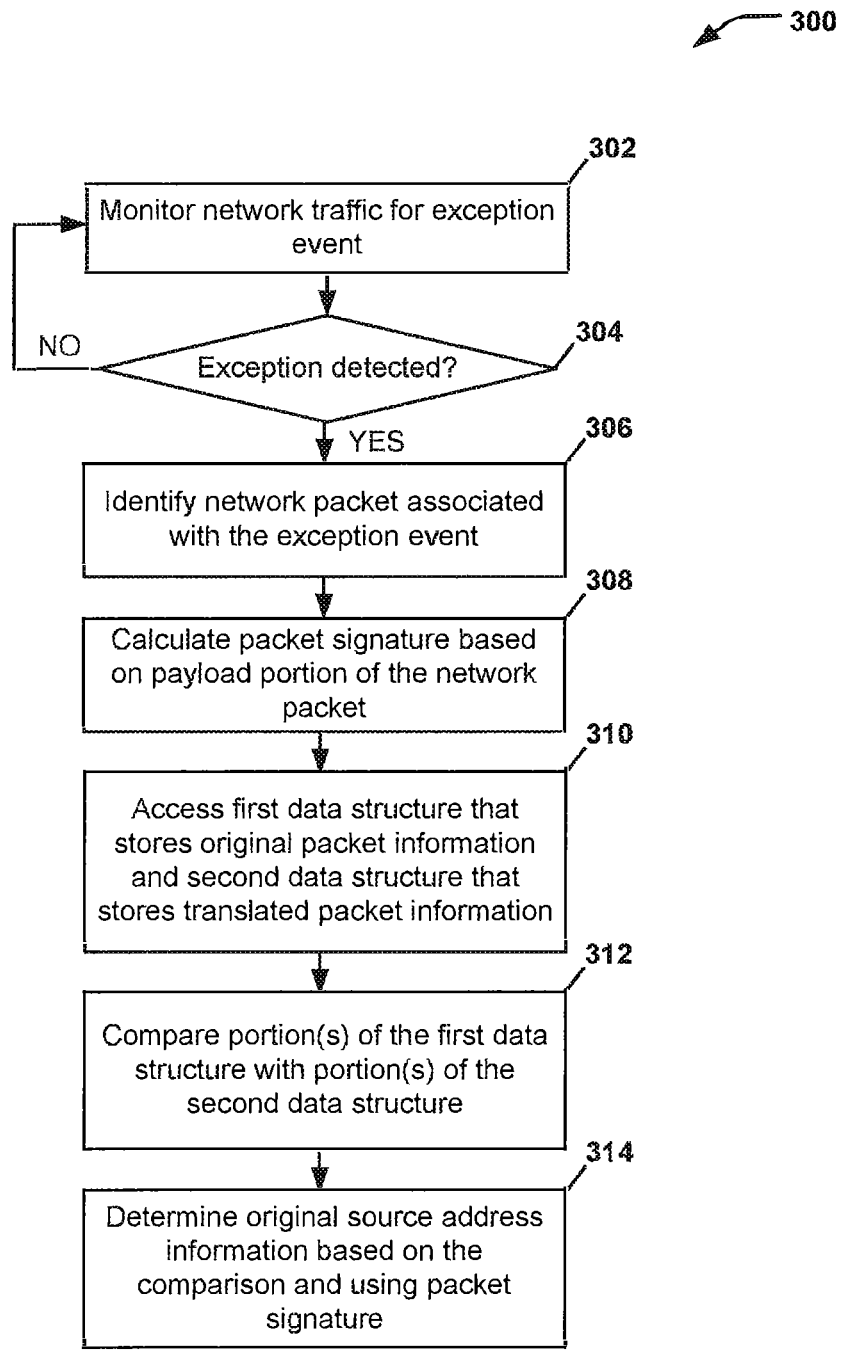
FIG. 3 is an example data flow diagram for determining source address information for network packets, according to an embodiment.

FIG. 3 illustrates a flow diagram of a method 300 for determining source address information for network packets. In certain embodiments, the method 300 may be performed by the network monitoring application 164 of the diagnostic device 162 of FIG. 1. Note that one or more steps, processes, and methods described herein may be omitted, performed in a different sequence, or combined as desired or appropriate.

At step 302, the network monitoring application 164 may monitor network traffic over a network 150 between the source computer(s) 102 and the destination computer(s) 134 for a network exception event. At step 304, the network monitoring application 164 may determine whether a network exception event has been detected. If the network monitoring application 164 determines that no exception event has been detected, the method proceeds back to step 302, where the network monitoring application 164 continues monitoring the network traffic.

At step 306, if the network monitoring application 164 determines that a network exception event has been detected, the network monitoring application 164 may identify a network packet associated with the network exception event.

At step 308, the network monitoring application 164 may calculate a packet signature based on a payload portion of the identified network packet. As previously mentioned, the packet signature may be hash value based on the payload portion of the identified network packet.

At step 310, the network monitoring application 164 may access a first data structure that stores original packet information associated with network packets transmitted from the source computer(s) 102 to the destination computer(s) 134. The network monitoring application 164 may also access a second data structure that stores translated packet information associated with the network packets that are transmitted form the source computer(s) 102 to the destination computer(s) 134.

At step 312, the network monitoring application 164 may compare one or more portions of the first data structure with one or more portions of the second data structure. At step 314, the network monitoring application 164 may determine original source address information based on the comparison and using the calculate packet signature.

Figure 4:
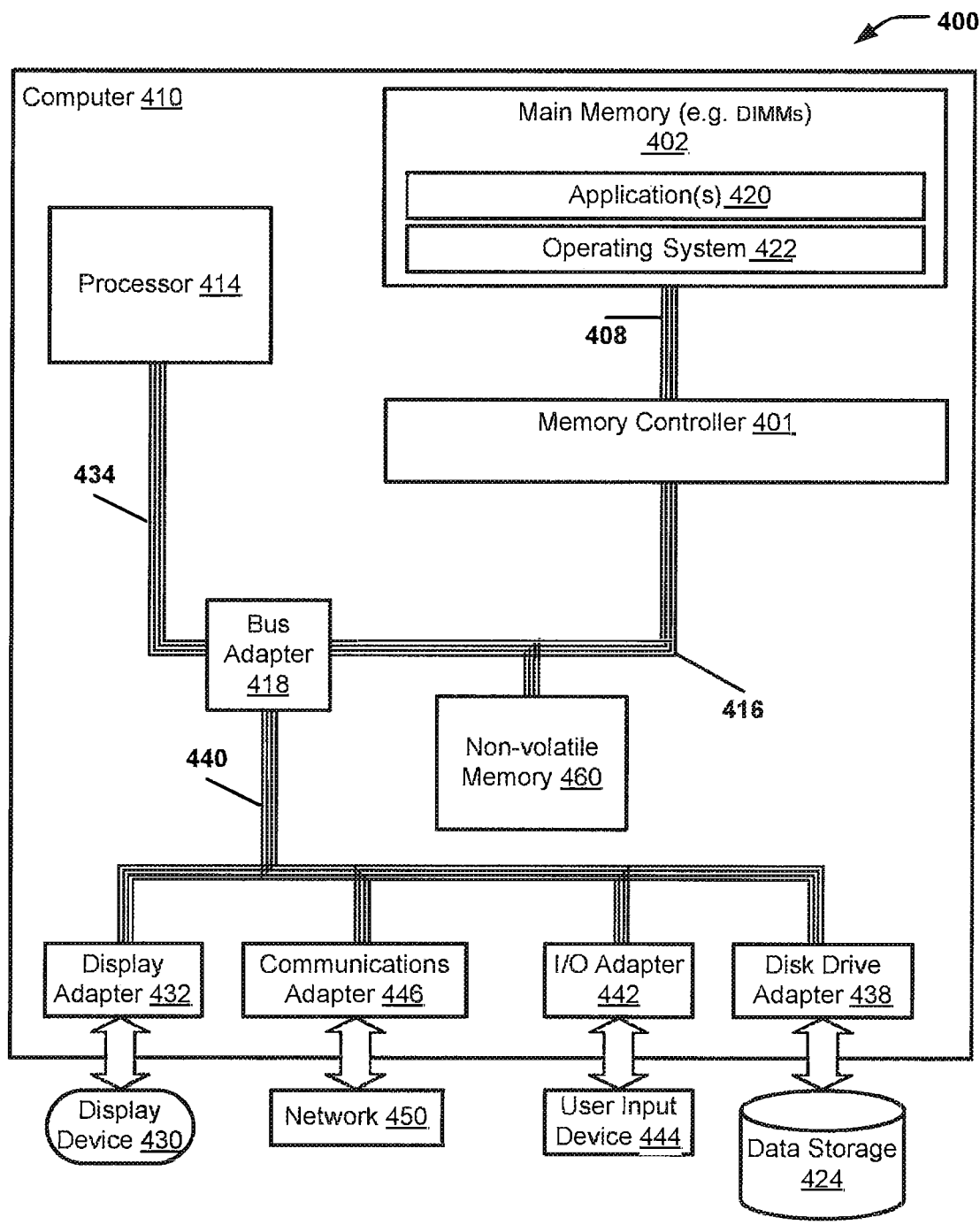
FIG. 4 is a block diagram of a computer system suitable for implementing one or more components in FIG. 1, according to an embodiment.

FIG. 4 is a block diagram of a computer system 400 suitable for implementing one or more components in FIG. 1, according to an embodiment. Referring to FIG. 4, an illustrative system 400 including a computer 410 is shown. The computer 410 may be an implementation of a computing system that includes or corresponds to the source computer(s) 102, the agent device 112, the diagnostic device 162, and/or destination computer(s) 134 of FIG. 1. The computer 410 includes at least one computer processor (CPU) 414 (e.g., a hardware processor) as well as main memory 402, a memory controller 401, and a non-volatile memory 460. The main memory 402 is connected through a memory bus 408 to the memory controller 401. The memory controller 401 and the non-volatile memory 460 are connected through a second memory bus 416 and a bus adapter 418 to the processor 414 through a processor bus 434.

Stored at the memory 402 are one or more applications 420 that may be module(s) or computer program instructions for carrying out particular tasks (e.g., logging application 114, network monitoring application 164 of FIG. 1). Also stored at the main memory 402 is an operating system 422. Operating systems include, but are not limited to, UNIX® (a registered trademark of The Open Group), Linux® (a registered trademark of Linus Torvalds), Windows® (a registered trademark of Microsoft Corporation, Redmond, Wash., United States), and others as will occur to those of skill in the art. The operating system 422 and the application 420 in the example of FIG. 4 are shown in the main memory 402, but components of the aforementioned software may also, or in addition, be stored at non-volatile memory (e.g., on data storage, such as data storage 424 and/or the non-volatile memory 460).

The computer 410 includes a disk drive adapter 438 coupled through an expansion bus 440 and the bus adapter 418 to the processor 414 and other components of the computer 410. The disk drive adapter 438 connects non-volatile data storage to the computer 410 in the form of the data storage 424 and may be implemented, for example, using Integrated Drive Electronics ("IDE") adapters, Small Computer System Interface ("SCSI") adapters, Serial Attached SCSI ("SAS") adapters, and others as will occur to those of skill in the art. Non-volatile computer memory also may be implemented as an optical disk drive, electrically erasable programmable read-only memory (so-called "EEPROM" or "Flash" memory), RAM drives, and other devices, as will occur to those of skill in the art. In a particular embodiment, the data storage 424 may store the data and information described herein.

The computer 410 also includes one or more input/output ("I/O") adapters 442 that implement user-oriented input/output through, for example, software drivers and computer hardware for controlling input and output to and from user input devices 444, such as keyboards and mice. In addition, the computer 410 includes a communications adapter 446 for data communications with a data communications network 460. The data communications may be carried out serially through Recommended Standard 232 (RS-232) connections (sometimes referred to as "serial" connections), through external buses such as a Universal Serial Bus ("USB"), through data communications networks such as internet protocol (IP) data communications networks, and in other ways as will occur to those of skill in the art. The communications adapter 446 implements the hardware level of data communications through which one computer sends data communications to another computer, directly or through a data communications network. Examples of the communications adapter 446 suitable to use in the computer 410 include, but are not limited to, modems for wired dial-up communications, Ethernet (Institute of Electrical and Electronics Engineers (IEEE) 802.3) adapters for wired network communications, and IEEE 802.11 adapters for wireless network communications. The computer 410 also includes a display adapter 432 that facilitates data communication between the bus adapter 418 and a display device 430, enabling the application 420 to visually present output on the display device 430.

In various embodiments of the present disclosure, execution of instruction sequences to practice the present disclosure may be performed by computer system 400. In various other embodiments of the present disclosure, a plurality of computer systems 400 coupled by communications adapter 446 to the network (e.g., such as a LAN, WLAN, and/or various other wired or wireless networks, including telecommunications, mobile, and cellular phone networks) may perform instruction sequences to practice the present disclosure in coordination with one another.

Particular embodiments described herein may take the form of an entirely hardware embodiment, an entirely software embodiment, or an embodiment containing both hardware and software elements. In a particular embodiment, the disclosed methods are implemented in software that is embedded in processor readable storage medium or storage device and executed by a processor that includes but is not limited to firmware, resident software, microcode, etc.

Further, embodiments of the present disclosure, may take the form of a computer program product accessible from a computer-usable or computer-readable storage device providing program code (e.g., computer-executable instructions) for use by or in connection with a computer, processor, or any instruction execution system. For the purposes of this description, a computer-usable or computer-readable storage device may be non-transitory and can be any apparatus that can tangibly embody a computer program and that can contain, store, communicate, propagate, or transport the program for use by or in connection with the instruction execution system, processor, apparatus, or device.

In various embodiments, the medium can include an electronic, magnetic, optical, electromagnetic, infrared, or semiconductor system (or apparatus or device) or a propagation medium. Examples of a computer-readable storage device include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile disk (DVD).

A data processing system suitable for storing and/or executing program code may include at least one processor coupled directly or indirectly to memory elements through a system bus. The memory elements can include local memory employed during actual execution of the program code, bulk storage, and cache memories that may provide temporary or more permanent storage of at least some program code in order to reduce the number of times code must be retrieved from bulk storage during execution.

Input/output or I/O devices (including but not limited to keyboards, displays, pointing devices, etc.) can be coupled to the data processing system either directly or through intervening I/O controllers. Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

What is claimed is:

1. A system, comprising:
   at least two processors; and
   at least two non-transitory computer-readable mediums having stored thereon instructions that are executable to cause the system to perform operations comprising:
   prior to a network address translation process occurring on a network packet transmitted from one of a plurality of source devices to one of a plurality of destination devices:
   capturing first network packet information for the network packet before the network packet passes through a network, wherein the first network packet information includes a network source address of the one of the plurality of source devices;
   calculating a first identifying packet signature for the network packet based on a payload of the network packet; and
   storing the first identifying packet signature as part of the first network packet information and separately from the network packet; and
   subsequent to the network packet being translated to a translated network packet through the network address translation process:
   determining, at a diagnostic device, that the translated network packet is associated with an exception event;
   based on the determining, calculating, at the diagnostic device, a second identifying packet signature based on the payload of the translated network packet;
   determining, by matching the first and second identifying packet signatures, the captured first network packet information; and
   determining the network source address for the network packet from the captured first network packet information, wherein the network source address is not present in the translated network packet.

2. The system of claim 1, wherein the network address translation process changes the network source address for the network packet into a different network source address.

3. The system of claim 1, wherein determining the network source address occurs subsequent to the translated network packet being delivered to the one of the plurality of destination devices.

4. The system of claim 1, wherein the system further comprises a network address translation device configured to translate the network source address of the network packet into a different network source address.

5. The system of claim 1, wherein calculating the first identifying packet signature for the network packet comprises determining a hash value corresponding to the network packet based on a payload portion of the network packet.

6. The system of claim 1, wherein the operations further comprise:
   generating a structure that includes at least the network source address of the network packet prior to the network translation process and a translated network source address of the network packet subsequent to the network translation process.

7. The system of claim 1, wherein the network source address of the network packet corresponds to the one of the plurality of source devices where the network packet originated prior to passing through the network.

8. A non-transitory computer-readable medium having stored thereon instructions that are executable by computer devices to cause the computer devices to perform operations comprising:
   prior to a network address translation process occurring on a network packet of a plurality of network packets from one of a plurality of source devices:
   capturing first network packet information for the network packet before the network packet passes through a network, the network packet destined to one of a plurality of destination devices, wherein the first network packet information includes a network source address of the one of the plurality of source devices;
   calculating a first identifying packet signature for the network packet based on a payload of the network packet; and
   storing the first identifying packet signature as part of the first network packet information for the network packet and separately from the network packet; and
   subsequent to the network packet being translated to a translated network packet through the network address translation process:
   determining, at a diagnostic device, that the translated network packet is associated with an exception event;
   based on the determining, calculating a second identifying packet signature based on the payload of the translated network packet; and
   matching the first and second identifying packet signatures to determine the captured first network packet information; and
   determining, the network source address for the network packet from the captured first network packet information, wherein the network source address is not present in the translated network packet.

9. The non-transitory computer-readable medium of claim 8, wherein the operations further comprise:
   sampling the plurality of network packets, including the network packet, from a second plurality of network packets that is greater in quantity than the plurality of network packets, wherein network packet information is not captured by the computer devices for at least some of the second plurality of network packets.

10. The non-transitory computer-readable medium of claim 8, wherein calculating the first identifying packet signature for the network packet further comprises:
    deriving a histogram from a payload portion of the network packet; and
    determining a hash value from the histogram.

11. The non-transitory computer-readable medium of claim 8, wherein the first network packet information comprises at least one of a Transmission Control Protocol (TCP) source port number or a User Datagram Protocol (UDP) source port number.

12. The non-transitory computer-readable medium of claim 8, wherein calculating the first identifying packet signature comprises determining a hash value corresponding to the network packet based on the payload of the network packet.

13. A method, comprising:
    prior to a network address translation process occurring on a network packet of a plurality of network packets from one a plurality of source devices:
    capturing, at an agent device, first network packet information for the network packet before the network packet passes through a network, wherein the network packet is destined for one of a plurality of destination devices;

calculating a first identifying packet signature for the network packet based on a payload of the network packet; and storing the first identifying packet signature in association with the first network packet information for the network packet in a data structure; and subsequent to the network packet being translated to a translated network packet through the network address translation process:

determining, at a diagnostic device, that the translated network packet is associated with an exception event;

based on the determining, calculating a second identifying packet signature based on the payload of the translated network packet;

matching the first and second identifying packet signature to determine the captured first network packet information; and determining a network source address for the network packet from the captured first network packet information, wherein the network source address is not present in the translated network packet.

14. The method of claim 13, wherein the first network packet information further comprises a source internet protocol (IP) address for the network packet.

15. The method of claim 13, wherein the first network packet information comprises timestamp information corresponding to a time at which the network packet was transmitted from the one of the plurality of source devices.

16. The method of claim 13, wherein the first identifying packet signature is stored in a relational database in association with the first network packet information.

17. The method of claim 13, wherein the network address translation process changes the network source address for the network packet into a different network source address.

18. The method of claim 13, wherein determining the network source address occurs subsequent to the translated network packet being delivered to the one of the plurality of destination devices.

19. The method of claim 13, wherein the first network packet information further comprises at least one of a Transmission Control Protocol (TCP) source port number or a User Datagram Protocol (UDP) source port number.

* * * * *